United States Patent [19]

Brierley et al.

[11] Patent Number: 4,881,943
[45] Date of Patent: Nov. 21, 1989

[54] DISPERSE DYES: NITRO-THIOPHENE AZO DYES FOR BRIGHT BLUE SHADES ON POLYESTER

[75] Inventors: David Brierley, Lancs; Ronald W. Kenyon, Manchester; Denis R. A. Ridyard, Hazel Grove, all of England

[73] Assignee: Imperial Chemical Industries PLC, London, England

[21] Appl. No.: 212,679

[22] Filed: Jun. 28, 1988

[30] Foreign Application Priority Data

Jun. 29, 1987 [GB] United Kingdom ............... 8715192
Feb. 23, 1988 [GB] United Kingdom ............... 8804172

[51] Int. Cl.$^4$ .................. C09B 29/03; D06P 1/18; D06P 3/54
[52] U.S. Cl. .......................... 8/662; 8/670; 8/922; 534/751; 534/753; 534/573
[58] Field of Search .............. 8/662; 534/753

[56] References Cited

U.S. PATENT DOCUMENTS 4,593,088 6/1986 Gourley .................... 534/768

FOREIGN PATENT DOCUMENTS 269953   6/1988 European Pat. Off.
1351381  4/1974 United Kingdom .
1394365  5/1975 United Kingdom .
1394367  5/1975 United Kingdom .
1394368  5/1975 United Kingdom .

Primary Examiner—A. Lionel Clingman
Attorney, Agent, or Firm—Cushman, Darby and Cushman

[57] ABSTRACT

A disperse monoazo dye of the formula:

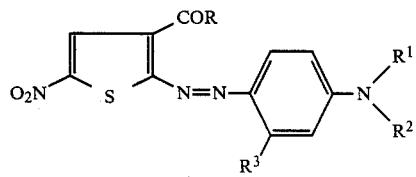

wherein each of R and $R^3$ represents a lower alkyl radical,
$R^1$ represents a lower alkyl or $C_3$–$C_6$ alkenyl radical and
$R^2$ represents a $C_2$–$C_6$ alkyl radical carrying a hydroxy or acyloxy substituent.

11 Claims, No Drawings

DISPERSE DYES: NITRO-THIOPHENE AZO DYES FOR BRIGHT BLUE SHADES ON POLYESTER

This invention relates to disperse dyes and more particularly to disperse dyes of the monoazo series and to methods for their manufacture and use.

In the synthetic dye field, many hundreds of individual products are manufactured. Of these, a small number become established as market leaders in their particular area of utility. Factors influencing the attainment of this status by a particular dye include hue, brightness, ease of manufacture, dyeing properties and fastness properties. One dye that has reached this position for the production of blue shades on polyester fibers is CI Disperse Blue 56 which has a simple anthraquinone structure and is easily applied giving bright blue colorations of high fastness.

Dyes of the anthraquinone series are noted for their brilliance of hue, especially in the blue region, and also for their excellent fastness properties, especially fastness to light. Unfortunately, they have relatively low tinctorial strength compared with all other major classes of dye and they are costly to manufacture. The replacement of anthraquinone dyes by other chromophores, because of their low cost-effectiveness, has been described by Renfrew (Rev.Prog.Coloration, 15, 1985, 15) as "a commercially attractive but technically difficult objective for dye manufacturers".

In a review of the disperse dye situation, Annen et al (Rev.Prog.Coloration, 17, 1987, 72) refer to the intensive efforts that have been made to replace anthraquinone dyes with technically equivalent and more economical products. The possible replacement of a number of red and blue anthraquinone dyes, including specifically the CI Disperse Blue 56 structure, by other chromophores is disscussed in some detail.

In our United Kingdom Patent No. 1394365, disperse dyes of the monoazo series based on certain 2-aminothiophene diazo components are described. The dyes vary in shade from yellow to green but, although cheaper to manufacture, none of the blue dyes specifically described has the combination of shade, brightness and fastness properties which are required in a replacement for CI Disperse Blue 56.

It has now been found, however, that a small class of dyes selected from the general class disclosed in Patent No. 1394365 provide the desired bright blue colorations having better heat and wet fastness that can be obtained from CI Disperse Blue 56 and at much lower cost.

Accordingly, the invention provides disperse monoazo dyes of the formula:

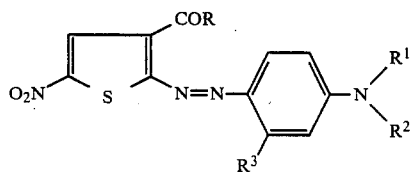   I wherein each of R and $R^3$ represents a lower alkyl radical, $R^1$ represents a lower alkyl or $C_3$–$C_6$ alkenyl radical and $R^2$ represents a $C_2$–$C_6$ alkyl radical carrying a hydroxy or acyloxy substituent.

Lower alkyl radicals which may be represented by R, $R^1$ and $R^3$ include $C_1$–$C_4$ radicals but R and $R^3$ are preferably methyl radicals and $R^1$ is preferably an ethyl radical.

Acyloxy substituents which may be present in $R^2$ include (i) radicals of the formula —$OCOR^4$ wherein $R^4$ represents an optionally substituted lower alkyl, aryl, arylalkyl or aryloxyalkyl radical, (ii) radicals of the formula —$OCOOR^5$ wherein $R^5$ represents an optionally substituted lower alkyl or aryl radical, and (iii) radicals of the formula —$OSO_2R^6$ wherein $R^6$ represents an optionally substituted lower alkyl or aryl radical.

As examples of optionally substituted lower alkyl radicals which may be represented by $R^4$, particular mention may be made of $C_1$–$C_4$ alkyl radicals which may be substituted by halogen (especially chloro or bromo), lower alkyl or lower alkoxy.

As examples of optionally substituted aryl radicals which may be represented by $R^4$, there may be mentioned phenyl radicals which may be substituted by halogen (especially chloro or bromo), lower alkyl, lower alkoxy, nitro, trifluoromethyl or cyano.

As examples of optionally substituted arylalkyl radicals which may be represented by $R^4$, there may be mentioned phenyl substituted lower alkyl radicals, for example benzyl, which may be substituted in the phenyl radical by lower alkyl, halogen (especially chloro or bromo), lower alkoxy, nitro or trifluoromethyl.

As examples of optionally substituted aryloxyalkyl radicals which may be represented by $R^4$, there may be mentioned phenoxy substituted lower alkyl radicals which may be substituted in the phenyl radical by lower alkyl, halogen (especially chloro or bromo).

It is preferred that $R^4$ is methyl.

As examples of optionally substituted lower alkyl and aryl radicals which may be represented by $R^5$, there may be mentioned optionally substituted $C_1$–$C_4$ alkyl radicals and phenyl radicals.

As examples of optionally substituted lower alkyl and aryl radicals which may be represented by $R^6$, there may be mentioned $C_1$–$C_4$ alkyl radicals and phenyl radicals which may be substituted by halogen (espescially chloro or bromo), lower alkyl, lower alkoxy or nitro.

Preferred examples of $R^2$ include 3-acetoxypropyl, 5-acetoxypentyl, 6-acetoxyhexyl and especially 4-acetoxybutyl. Other structures deserving particular mention include 2-hydroxyethyl, 2-hydroxypropyl, 3-hydroxypropyl, 2-hydroxybutyl, 4-hydroxybutyl, 5-hydroxypentyl and 6-hydroxyhexyl.

The dyes of Formula I may be prepared by diazotising an amine of the formula:

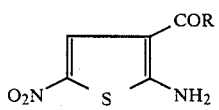   II wherein R has the meansings stated above, and coupling the resulting diazo compound with an aromatic amine of the formula:

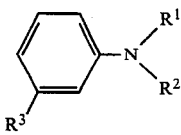

wherein $R^1$, $R^2$ and $R^3$ have the meanings stated above.

The diazotisation and coupling may be carried out by appropriate methods conventionally used for these reactants and the dyes so formed may be isolated using known techniques.

In order to achieve maximum brightness, it can be advantageous to subject the dyes to conventional purification procedures, for example recrystallisation from organic solvents, chromatographic separations or washing with aqueous organic solvents. Suitable solvents for this purpose include alcohols, for example methanol, ethanol, propanol, isopropanol, ethylene glycol, diethylene glycol and the mono-lower alkyl ethers of these glycols, for example the methyl, ethyl and n-butyl ethers.

The 2-aminothiophenes of Formula II are known compounds and may be prepared by methods described in the prior art for the production of thiophene derivatives. The aromatic amines of Formula III are also known compounds.

The disperse monoazo dyes of the invention are valuable for colouring synthetic textile materials, especially secondary cellulose acetate, cellulose triacetate, polyamide such as polyhexamethylene adipadimide and, above all, aromatic polyester such as polyethylene terephthalate textile materials. Such materials can be in the form of filaments, loose fibres, yarn or woven or knitted fabrics. The dyes are also useful for colouring fibre blends containing one or more synthetic fibrous material together with other types of fibre, for example polyester-cotton blends.

The dyes, optionally in conjunction with other disperse dyes, may be applied to the synthetic textile materials by methods which are conventionally employed in applying disperse dyes to such materials. Thus, the dyes in the form of aqueous dispersions can be applied by dyeing, padding or printing processes using the conditions and additives conventionally used in carrying out such processes.

The dyes may also be applied to textile materials by known methods of transfer colour printing such as sublimation transfer printing and wet transfer printing. They can also be used for the melt coloration of synthetic polymers and as pigments for the coloration of inks and paints.

The invention is illustrated but not limited by the following Examples.

EXAMPLE 1

3.22g of sodium nitrite was added to 20ml of concentrated sulphuric acid and the mixture heated to 70° C. and then cooled to 5° C. A further 15ml of concentrated sulphuric acid was added followed by 25ml of an 86:14 mixture of acetic acid and propionic acid. 8.45g of 2-amino-3-acetyl-5-nitrothiophene was then added slowly below 0° C. and the mixture stirred at −2 to 0° C. for 2 hours and then at 0 to 2° C. for 3 hours when diazotisation was complete. The solution was then added to a mixture of 17g of N-(4-acetoxybutyl)-N-ethyl-m-toluidine, 100ml of methanol, 200g of crushed ice and 25ml of 1M sulphamic acid solution. The temperature was maintained at 0°–5° C. and the pH at 1–2 by addition of sodium acetate solution. The mixture was stirred at 0°–5° C. for 2 hours and then the product filtered off, and washed with water. The filter cake was slurried in 50% aqueous methanol, refiltered and washed with methanol. Drying at 60° C. gave 9.79g of product. Alternatively, the product may be purified by slurrying in other aqueous solvents such as aqueous ethanol, 2-methoxyethanol, 2-ethoxyethanol, 2-n-butoxy-ethanol, or ethylene glycol, and if necessary heating up to reflux temperature then cooling and refiltering.

When applied to an aromatic polyester material from an aqueous dispersion, it gives a bright blue shade similar to that given by the anthraquinone dyestuff, CI Disperse Blue 56, with good build up, good heat fastness and light fastness and good wet fastness.

EXAMPLE 2

In place of the 17g of N-(4-acetoxybutyl)-N-ethyl-m-toluidine used in Example 1, there was used 17.9g of N-(5-acetoxypentyl)-N-ethyl-m-toluidine.

When applied to aromatic polyester materials from an aqueous dispersion, the product gave bright blue shades similar to the anthraquinone dyestuff CI Disperse Blue 56 and showed good build up, good heat and light fastness and good wet fastness.

EXAMPLE 3

In place of the 17g of N-(4-acetoxybutyl)-N-ethyl-m-toluidine used in Example 1, there was used 16.1g of N-ethyl-N-(6-hydroxyhexyl)-m-toluidine.

When applied to aromatic polyester materials, the product gave bright blue sshades similar to Example 1 with good heat and light fastness and good build up.

EXAMPLE 4

In place of the 17g of N-(4-acetoxybutyl)-N-ethyl-m-toluidine used in Example 1, there was used 19g of N-(6-acetoxyhexyl)-N-ethyl-m-toluidine.

When applied to polyester materials, the product gave shades similar to CI Disperse Blue 56 with good build up, good heat and light fastness and good wet fastness.

EXAMPLE 5

In place of the 17g of N-(4-acetoxybutyl)-N-ethyl-m-toluidine used in Example 1, there was used 16.1g of N-(4-acetoxybutyl)-N-methyl-m-toluidine.

When applied to aromatic polyester materials, the product gave bright blue shades having good build up, good heat and light fastness and good wet fastness.

EXAMPLE 6

In place of the 17g of N-(4-acetoxybutyl)-N-ethyl-m-toluidine used in Example 1, there was used 19g of N-(4-acetoxybutyl)-N-n-butyl-m-toluidine.

When applied to aromatic polyester textile materials, the product gave shades similar to CI Disperse Blue 56 with good build up, good heat and light fastness and good wet fastness.

EXAMPLE 7

In place of the 8.45g of 2-amino-3-acetyl-5-nitrothiophene used in Example 1, there was used 9.2g of 2-amino-3-propionyl-5-nitrothiophene.

When applied to aromatic polyester materials, the product gave shades very similar to CI Disperse Blue 56 with good build up, good heat and light fastness and good wet fastness.

EXAMPLE 8

In place of the 8.45g of 2-amino-3-acetyl-5-nitrothiophene used in Example 1, there was used 9.8g of 2-amino-3-butyryl-5-nitrothiophene.

The product gave bright blue shades on polyester materials having good build up, good heat and light fastness and good wet fastness.

EXAMPLE 9

In place of the 17g of N-(4-acetoxybutyl)-N-ethyl-m-toluidine used in Example 1, there was used 14.1g of N-ethyl-N-(2-hydroxybutyl)-m-toluidine.

The product gave bright blue shades on polyester materials similar to Example 1 with good build up and good heat and light fastness.

EXAMPLE 10

In place of the 17g of N-(4-acetoxybutyl)-N-ethyl-m-toluidine used in Example 1, there was used 14.1g of N-ethyl-N-(4-hydroxybutyl)-m-toluidine.

The product gave bright blue shades on polyester materials similar to CI Disperse Blue 56 with good build up and good heat and light fastness.

EXAMPLE 11

In place of the 17g of N-(4-acetoxybutyl)-N-ethyl-m-toluidine used in Example 1, there was used 12.2g of N-ethyl-N-(2-hydroxyethyl)-m-toluidine.

The product gave blue shades on polyester materials similar to CI Disperse Blue 56 with good build up and good heat and light fastness.

EXAMPLE 12

In place of the 17g of N-(4-acetoxybutyl)-N-ethyl-m-toluidine used in Example 1, there was used 13.2g of N-ethyl-N-(3-hydroxypropyl)-m-toluidine.

The product gave bright blue shades on polyester materials similar to Example 1 having good build up and good heat and light fastness.

EXAMPLE 13

In place of the 17g of N-(4-acetoxybutyl)-N-ethyl-m-toluidine used in Example 1, there was used 17.8g of N-(4-acetoxy-butyl)-N-allyl-m-toluidine.

The product gave bright blue shades on polyester materials similar to Example 1 with good build up, good heat and light fastness and good wet fastness.

EXAMPLE 14

In place of the 17g of N-(4-acetoxybutyl)-N-ethyl-m-toluidine used in Example 1, there was used 18g of N-ethyl-N-(4-propionyloxybutyl)-m-toluidine.

The product gave bright blue shades on polyester materials similar to Example 1 with good build up, good heat and light fastness and good wet fastness.

EXAMPLE 15

In place of the 17g of N-(4-acetoxybutyl)-N-ethyl-m-toluidine used in Example 1, there was used 19g of N-(4-butyryloxybutyl)-N-ethyl-m-toluidine.

The product gave bright blue shades on polyester materials similar to Example 1 with good build up, good heat and light fastness and good wet fastness.

EXAMPLE 16

In place of the 17g of N-(4-acetoxybutyl)-N-ethyl-m-toluidine used in Example 1, there was used 21.3g of N-(4-benzoyloxybutyl)-N-ethyl-m-toluidine.

The product gave bright blue shades on polyester materials similar to Example 1 with good heat and light fastness and good wet fastness.

EXAMPLE 17

In place of the 17g of N-(4-acetoxybutyl)-N-ethyl-m-toluidine used in Example 1, there was used 19.1g of N-(4-ethoxycarbonyloxybutyl)-N-ethyl-m-toluidine.

The product gave bright blue shades on polyester materials similar to CI Disperse Blue 56 with good build up, good heat and light fastness and good wet fastness.

EXAMPLE 18

In place of the 17g of N-(4-acetoxybutyl)-N-ethyl-m-toluidine used in Example 1, there was used 19.5g of N-(4-methylsulphonyloxybutyl)-N-ethyl-m-toluidine.

The product gave bright blue shades on polyester materials similar to Example 1 with good build up, good heat and light fastness and good wet fastness.

EXAMPLE 19

In place of the 17g of N-(4-acetoxybutyl)-N-ethyl-m-toluidine used in Example 1, there was used 23.3g of N-ethyl-N-(4-phenoxyacetoxybutyl)-m-toluidine.

The product gave bright blue shades on polyester materials similar to Example 1 with good heat and light fastness and good wet fastness.

EXAMPLE 20

In place of the 17g of N-(4-acetoxybutyl)-N-ethyl-m-toluidine used in Example 1, there was used 22.2g of N-ethyl-N-(4-phenylacetoxybutyl)-m-toluidine.

The product gave bright blue shades on polyester materials similar to Example 1 with good heat and light fastness and good wet fastness.

EXAMPLE 21

In place of the 17g of N-(4-acetoxybutyl)-N-ethyl-m-toluidine used in Example 1, there was used 23.7g of N-ethyl-N-(4-phenylsulphonyloxybutyl)-m-toluidine.

The product gave bright blue shades on polyester materials similar to Example 1 with good heat and light fastness and good wet fastness.

EXAMPLE 22

In place of the 17g of N-(4-acetoxybutyl)-N-ethyl-m-toluidine used in Example 1, there was used 16g of N-(3-acetoxypropyl)-N-ethyl-m-toluidine.

The product gave bright blue shades on polyester materials with good heat and light fastness and good wet fastness.

We claim:

1. A disperse monoazo dye of the formula:

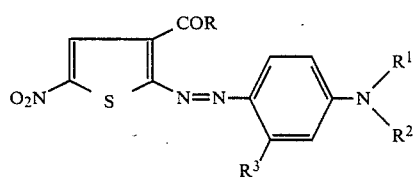

wherein each of R and $R^3$ represents a lower alkyl radical, $R^1$ represents a lower alkyl or $C_3$–$C_6$ alkenyl radical and $R^2$ represents a $C_2$–$C_6$ alkyl radical carrying a hydroxy or acyloxy substituent.

2. A disperse monoazo dye according to claim 1 or claim 2 wherein R is methyl.

3. A disperse monoazo dye according to claim 1 or claim 2 wherein $R^3$ is methyl.

4. A disperse monoazo dye according to any preceding claim wherein $R^1$ is ethyl.

5. A disperse monoazo dye according to any preceding claim wherein $R^2$ contains an acyloxy substituent of the formula:

—OCOR$^4$ wherein $R^4$ represents an optionally substituted lower alkyl, aryl, aralkyl or aryloxyalkyl radical.

6. A disperse monoazo dye according to claim 5 where $R^4$ is methyl

7. A disperse monoazo dye according to claim 6 wherein $R^2$ is 3-acetoxypropyl, 5-acetoxypentyl, 6-acetoxyhexyl or 4-acetoxybutyl.

8. A disperse monoazo dye according to any of claims 1 to 4 wherein $R^2$ is 2-hydroxyethyl, 2-hydroxypropyl, 3-hydroxypropyl, 2-hydroxybutyl, 4-hydroxybutyl, 5-hydroxypentyl or 6-hydroxyhexyl.

9. A method for the preparation of a disperse monoazo dye as defined in claim 1 which comprises diazotising an amine of the formula:

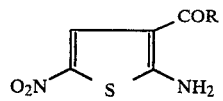

and coupling the resulting diazo compound with an aromatic amine of the formula:

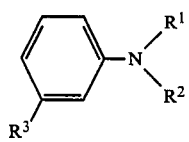

wherein R, $R^1$, $R^2$ and $R^3$ have the meanings given in claim 1.

10. A process for the coloration of synthetic textile materials which comprises applying thereto by a dyeing, padding or printing technique, an aqueous dispersion of a disperse monoazo dye according to any of claims 1 to 8.

11. A process according to claim 10 wherein the synthetic textile material comprises an aromatic polyester textile material.

* * * * *